United States Patent [19]

Sherlock et al.

[11] 4,185,899
[45] Jan. 29, 1980

[54] COMBINATION VIEWER AND PROJECTOR

[75] Inventors: Hugh P. Sherlock, Palo Alto; Edwin E. Ewry, Mill Valley; Werner E. Sandvoss, San Jose; Werner W. Ciupke, Burlingame; Glenn E. Brown, Los Gatos; William T. Link, Berkeley, all of Calif.

[73] Assignee: Action Films, Inc., Mountain View, Calif.

[21] Appl. No.: 691,385

[22] Filed: Jun. 1, 1976

Related U.S. Application Data

[63] Continuation of Ser. No. 410,819, Oct. 29, 1973, abandoned.

[51] Int. Cl.² .................. G03B 21/10; G03B 21/16
[52] U.S. Cl. .................................. 352/72; 352/104; 352/198; 352/202; 353/71
[58] Field of Search ................. 352/72, 78, 104, 136, 352/198, 202, 242; 353/98, 99, 81, 52, 119, 71; 240/41.35; 362/3, 202

[56] References Cited

U.S. PATENT DOCUMENTS

| | | | |
|---|---|---|---|
| 2,226,638 | 12/1940 | Riedel | 352/242 |
| 3,071,681 | 1/1963 | Schmidt et al. | 240/41.35 R X |
| 3,128,050 | 4/1964 | Parker | 240/41.35 X |
| 3,175,080 | 3/1965 | Moore | 240/41.35 X |
| 3,283,652 | 11/1966 | Busch | 352/104 X |
| 3,375,055 | 3/1968 | Hughes | 352/72 |
| 3,387,535 | 6/1968 | Bennett | 353/78 X |
| 3,520,599 | 7/1970 | Martinez | 353/52 X |
| 3,547,529 | 3/1968 | Anthes | 352/72 X |
| 3,582,195 | 6/1971 | Pignone | 352/78 R |
| 3,592,537 | 7/1971 | Kakiuchi et al. | 352/104 X |
| 3,610,747 | 10/1971 | Bickel | 352/146 |
| 3,695,746 | 10/1972 | Youngblood | 353/71 X |
| 3,736,051 | 5/1973 | Conner et al. | 352/72 |
| 3,739,069 | 6/1973 | Sandmeir | 353/71 |
| 3,761,170 | 9/1973 | Genesky et al. | 353/87 |
| 3,791,723 | 2/1974 | Komazaki | 352/72 |
| 3,807,847 | 4/1974 | Okano | 353/71 |
| 3,817,610 | 6/1974 | Skinner et al. | 352/72 X |
| 3,834,798 | 9/1974 | Bundshuh et al. | 352/104 |
| 3,871,754 | 3/1975 | Procop et al. | 352/78 R |

Primary Examiner—L. T. Hix
Assistant Examiner—Alan Mathews
Attorney, Agent, or Firm—Hohbach, Harold C.

[57] ABSTRACT

A combination viewer and projector having a housing with a rear-lighted viewing screen mounted therein. The housing is adapted to receive a magazine having a length of film therein which can be advanced past an aperture in the magazine. A source of light is provided in the housing and is then directed into the magazine to form an image from the film in the aperture. Means is provided in the housing for receiving the image and for directing it onto a rear-lighted screen or alternatively through a projection opening in the housing.

18 Claims, 15 Drawing Figures

COMBINATION VIEWER AND PROJECTOR

This is a continuation of application Ser. No. 410,819 filed Oct. 29, 1973, now abandoned.

BACKGROUND OF THE INVENTION

Viewers and projectors of various types have heretofore been provided. Those with rear view screens often do not provide a bright enough image to permit viewing under normal ambient light conditions. Film cartridges have not been usable with many of them. In addition, it has been difficult in the past to obtain a combination viewer and projector and particularly one which is suitable for use by children. There is, therefore, a need for a new and improved combination motion picture viewer and projector and particularly one based upon the use of a film cartridge.

SUMMARY OF THE INVENTION AND OBJECTS

The combination viewer and projector is of a type which is adapted to be utilized with a magazine having an aperture therein and a length of film which can be advanced past the aperture. A source of light is provided in the housing and means is provided in the housing to operate in combination with the magazine for receiving light from the source of light and directing it onto the film to produce an image in the aperture of the magazine. A rear-lighted viewing screen is carried in the housing. The housing is formed with a projection opening. Means is provided in the housing for receiving the image from the aperture and directing the image onto the rear-lighted screen or alternatively for projecting the same through the projection opening. Means is carried by the housing for advancing the length of film in the magazine to provide motion picture images in the viewing aperture.

In general, it is an object of the present invention to provide a combination motion picture viewer and projector which can be utilized in conjunction with a removable magazine.

Another object of the invention is to provide a combination viewer and projector of the above character which is streamlined and has an attractive appearance.

Another object of the invention is to provide a combination viewer and projector of the above character which provides an image on a rear view screen which can be viewed in ambient light.

Another object of the invention is to provide a combination viewer and projector of the above character which has a high efficiency light gathering system so that adequate image brightness is achieved with a low power lamp which does not require forced air cooling.

Another object of the invention is to provide a combination viewer and projector of the above character in which the rear-lighted screen is mounted at a convenient angle to facilitate viewing.

Another object of the invention is to provide a combination viewer and projector of the above character which can be readily operated and in fact is so simple that it can be operated by children.

Another object of the invention is to provide a combination viewer and projector of the above character in which the lamp can be readily replaced without the need of readjusting the focus of the lamp.

Another object of the invention is to provide a combination viewer and projector of the above character which can be readily maintained.

Another object of the invention is to provide a combination viewer and projector of the above character which is relatively simple in construction and which can be readily fabricated by mass production techniques.

Another object of the invention is to provide a combination viewer and projector of the above character which can utilize a removable cartridge of the type which can be viewed in a direct viewing viewer.

Another object of the invention is to provide a combination viewer and projector of the above character in which the cartridge is of the type having an endless loop of film therein which can be moved in forward and reverse directions.

Another object of the invention is to provide a combination viewer and projector of the above character which has daylight viewing capabilities.

Another object of the invention is to provide a combination viewer and projector of the above character in which all the parts of the optical system may be molded parts.

Another object of the invention is to provide a combination viewer and projector of the above character which is provided with transformer holding means.

Another object of the invention is to provide a combination viewer and projector of the above character which can be readily constructed so that it can be solely a viewer or solely a projector.

Additional objects and features of the invention will appear from the following description in which the preferred embodiments are set forth in detail in conjunction with the accompanying drawings.

DESCRIPTION OF THE PREFERRED EMBODIMENTS

The combination viewer and projector consists of a two part housing 21 formed of an upper part of half 22 and a lower part of half 23. As can be seen from the drawings, the housing has been designed to give an attractive streamlined appearance. The housing is formed of a suitable material such as plastic and the two parts 22 and 23 are fastened together by suitable means such as screws 26 which extend through bosses or protrusions 27 formed integral with the upper and lower part and interior of the housing 21 (see FIG. 4). It should be pointed out that a housing or case 21 is generally light-tight but this is not absolutely necessary for reasons hereinafter described.

The front of the housing 21 is formed with a large opening 31 in which there is mounted a rear-lighted viewing screen 32. The screen 32 can be of any suitable type. For example, it can be of a transparent element such as plastic with a surface which has dispersing particles on it or a roughened light dispersing surface.

The screen 32 is retained into a U-shaped recess 33 which extends around the perimeter of the opening 31. The screen 32 lies in a plane which is inclined approximately 20° from the vertical so that the screen can be readily viewed when it is mounted on a desk or other suitable support. The housing 21 is formed in such a manner that there is provided a shield or shroud 34 which extends outwardly from and around the face of the screen in a direction which is generally at right angles to the screen 32 for a distance of approximately 1½ inches to shield the screen from extraneous ambient light. As will be noted from FIGS. 1 and 4, the screen 32 is provided at the left front-hand side of the viewer. On the right front-hand side of the housing 21, the housing is provided with a recess 36 hereinafter described in greater detail which opens through an opening 34 provided in a front wall 38. The recess 36 is adapted to receive a film cartridge 41 of the type hereinafter described. As can be seen from FIG. 4, the film cartridge 41 when disposed in a "home" position within the recess 36 in the housing 21 has its rearmost extremity generally flush or slightly recessed from the outer surface of the housing 21 to prevent damage to the cartridge in the event the combination viewer and projector is accidentally dropped. Thus, it can be seen that the wall 38 is also recessed with respect to the front of the housing.

The housing 21 is provided with a top wall 46 which is generally planar but is curved slightly to the rear and a bottom wall 48 which is generally parallel to the top wall 47. The housing is also provided with a rear wall 49 and side walls 51 and 52, all of which extend generally at right angles to the top wall 47 and the bottom wall 48. The side wall 52 is provided with a cut-out 53 adjacent the front extremity of the same to facilitate grasping of the outer extremity of the magazine or cartridge 41 to permit insertion and removal of the magazine from the combination viewer and projector.

Figure 2:
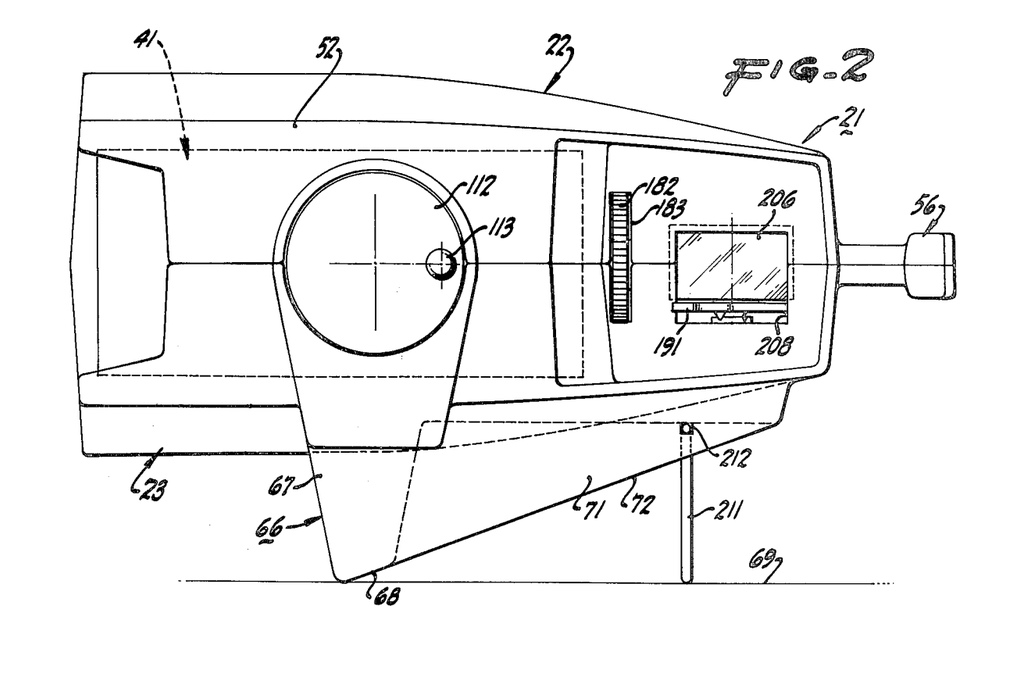
FIG. 2 is a side elevational view looking along the line 2—2 of FIG. 1.

A handle 56 is formed integral with the rear wall 49. As shown in FIG. 2, the handle is formed as a part of the upper and lower parts 22 and 23 and is fastened together by screws 57. The handle 56 is formed by a longitudinally extending portion 58 and outwardly extending inclined post-like portions 59 which are formed integral with the rear wall 49. As can be seen from FIG. 4, the portions 58 and 59 have voids 61 therein. With this construction, it can be seen that there is provided a space 62 between the longitudinally extending portion 59 and the rear wall 49 of the case so that a hand can be readily inserted into the handle to facilitate movement of the combination viewer and projector from one location to another.

Figure 3:
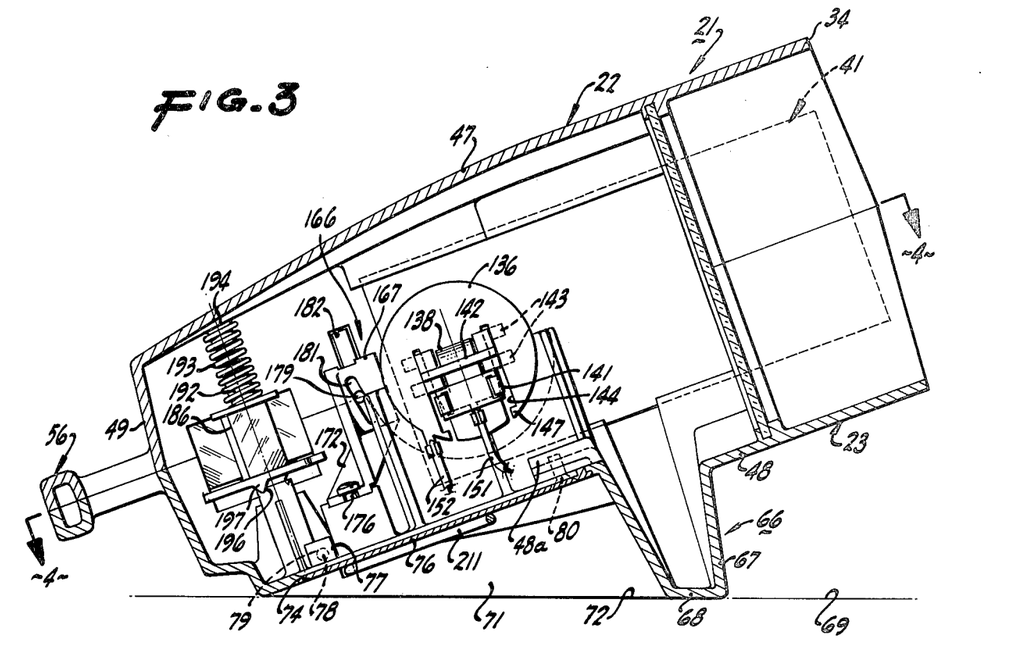
FIG. 3 is a cross-sectional view taken along the line 3—3 of FIG. 1.

A base 66 is formed integral with the bottom wall 48 of the housing 21 and includes a frontal foot-like portion 67 which extends across the front of the housing (see FIG. 1) but which is spaced substantially to the rear of the front extremity of the housing. As can be seen from FIG. 3, this frontal foot-like portion 67 extends generally in a vertical direction and provides an attractive surface which blends in with the overall appearance of the combination viewer and projector. The foot-like portion 67 is provided with a bottom surface 68 which is adapted to rest upon a table or other support 69. This surface 68 is inclined at an angle of approximately 20° with respect to the bottom wall so that the major portion of the housing 21 is canted upwardly at an angle so that the viewing screen is inclined approximately 20° from the vertical to facilitate viewing of the screen 32 by the viewer. The base also includes side foot-like portions 71 formed integral with the frontal foot-like portions 67 and which extend at right angles with respect thereto. As can be seen from FIG. 2, these side foot-like portions 71 decrease in height toward the rear of the housing 71 and have a bottom surface 72 which lies in the same plane as the surface 68 of the portion 67.

The bottom wall 48 is formed with an opening 74 within the confines of the base 66. An access door 76 is provided for closing the opening 74 and is provided with a pair of outwardly extending members which carry pins 78 which are adapted to fit into holes 79 provided in the bottom wall 48 of the housing 21. A screw 80 is provided in the other end of the access door 77 and is threaded into a tab portion 48a provided on the bottom wall.

The cartridge 41 is identical to that disclosed in co-pending application Ser. No. 78,115, filed Oct. 5, 1970, abandoned in favor of U.S. Pat. No. 3,817,610 and is similar in some respects to the magazine or cartridge disclosed in U.S. Pat. No. 3,706,439. Such a cartridge is of a type which can be used for direct viewing. As disclosed in said copending application, the cartridge or magazine 41 is provided with a rectangular case 81 in which there is formed a window 82 that is adapted to receive light for transmission onto a member 83 having a reflecting surface 84 which directs the received light through a 90° angle and through an aperture (not shown) provided in the front wall of the cartridge or magazine. The cartridge or magazine carries an endless loop of film (not shown) which is adapted to be progressively advanced past the aperture provided in the magazine so that light reflected from the surface 84 can pass through the film from the emulsion side to provide an image which is right side up and in which the end to end relationship is such that any printing reads from left to right. The endless loop of film is adapted to be advanced by a sprocket (not shown) which is driven by a driven member 86 carried by the cartridge. The film can be moved in either forward or reverse directions. An inclined ramp 87 is formed on the cartridge and facilitates engagement of the driven member 86 with a drive member as hereinafter described.

Figure 8:
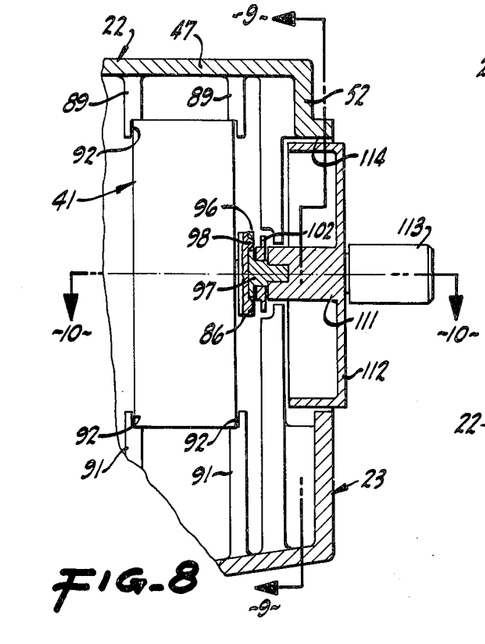
FIG. 8 is a cross-sectional view taken along the line 8—8 of FIG. 4.

The cartridge or magazine 41 is adapted to be inserted into the recess 36 upside down from its normal position in a conventional viewer and is guided by upper and lower pairs of spaced parallel rails 89 and 91 (see FIG. 8) formed integral with the housing or case 21. The rails 89 and 91 are provided with L-shaped recesses 92 in the outer extremities which face each other and which are adapted to engage four corners of the magazine 41. These rails 89 and 91 serve to firmly position the cartridge and to hold it in place. In addition, there is provided an upwardly extending plastic tab 93 integral with the housing 21 which is adapted to be engaged by the forward extremity of the cartridge (see FIG. 4) and which must be shifted slightly by the cartridge when the cartridge is inserted into its "home" position within the recess 36 so that the forward extremity of the cartridge or magazine 41 cannot wiggle within the housing 21.

Figure 10:
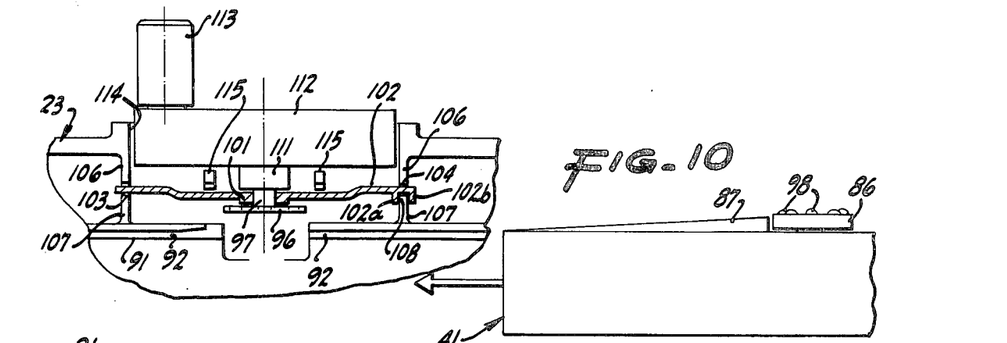
FIG. 10 is a cross-sectional view taken along the line 10—10 of FIG. 8.

When the cartridge 41 is inserted into its "home" position within the recess 36, a drive member 96 mounted on a shaft 97 is cammed outwardly by the ramp 87 over the top of the driven member 86 until it engages the driven member. Cooperative mating means is provided between the drive member and the driven member so that the driven member 86 will be rotated as the drive member is rotated and consists of protrusions 98 carried by the drive member and recesses 99 carried by the driven member. The shaft 97 is rotatably mounted in a boss 101 carried by a rectangular spring-like member 102 in the form of a bar or plate. The spring-like member 102 in the form of a bar or plate is formed of a suitable material such as plastic. The ends of the separate member 102 are seated in slots 103 and 104 formed between the wall extensions 106 and 107 formed in the upper and lower parts 22 and 23 of the housing 21. One end of the member 102 is provided with outwardly extending portions 102a and 102b which extend at right angles to the main axis of the member 102 and form a recess 108. As shown in FIG. 10, one end of the member 102 is disposed in the slot 104. With this type of construction it can be seen that the member 102 is firmly secured between the upper and lower parts 22 and 23 of the housing 21 and has its extremities retained within the slots 103 and 104. The shaft 97 is mounted in a boss 111 (see FIG. 8) which is formed integral with the crank disc 112. The crank disc 112 is provided with a knob or handle 113 which is rotatably mounted on the outer margin of the crank disc 112. The handle 113 is adapted to be grasped by two fingers of one hand to permit the manual rotation of the crank disc 112. The crank disc 112 is seated within a cylindrical recess 114 provided in the side wall 52 of the housing 21. As can be seen, the outer surface of the crank disc 112 is generally flush with the outer surface of the side wall 52.

Figure 9:
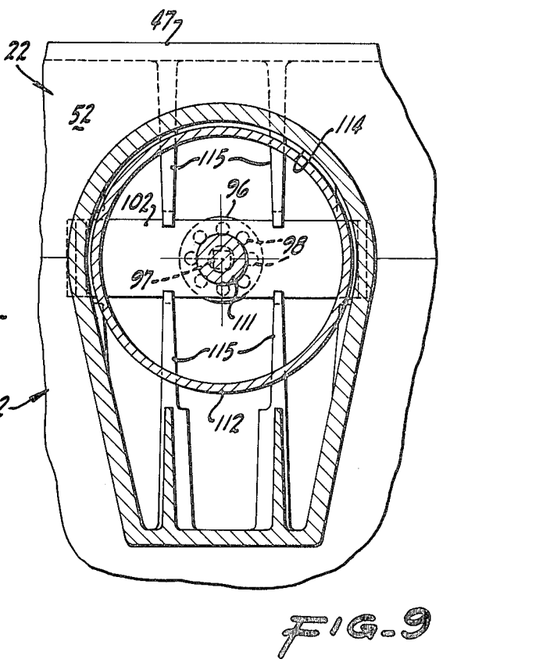
FIG. 9 is a cross-sectional view taken along the line 9—9 of FIG. 8.

Upwardly and downwardly extending ribs 115 are formed integral with the upper and lower parts of the housing 21 and have extremities which extend into the region of the spring member 102 (see FIGS. 9 and 10). As will be noted particularly from FIG. 10, the innermost extremities of these ribs 115 are spaced outwardly from the member 102 so that the member 102 can be sprung outwardly a predetermined distance to permit the drive member 96 to be cammed out of the way as hereinbefore described. More than sufficient clearance is provided between the bar 102 and the ribs 115 to permit this to take place. However, the ribs 115 prevent someone from accidentally pulling the member 102 out of the housing 21 by pulling on the handle 113 or the crank disc 112.

Figures 1, 5, 6, 7:
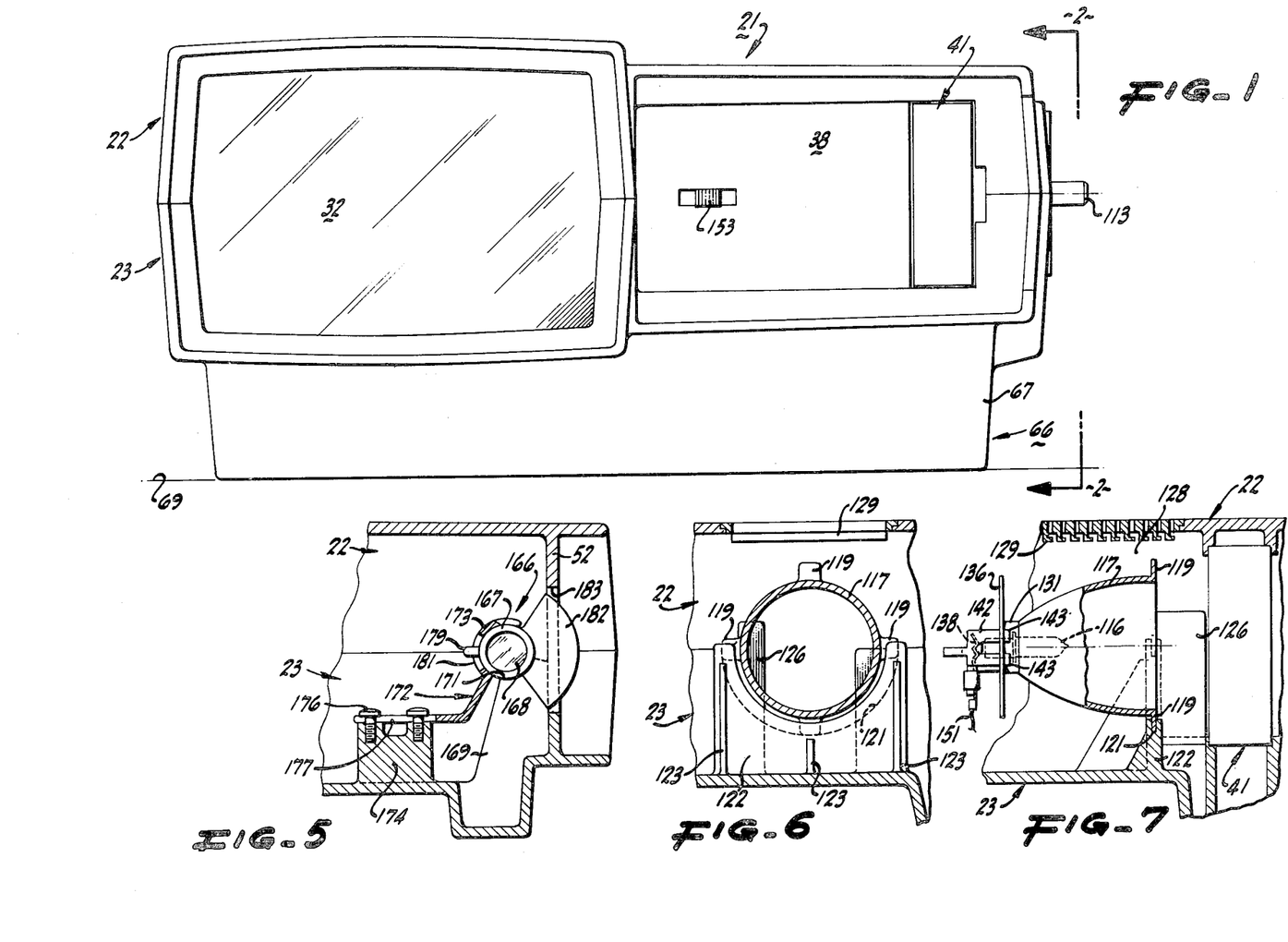
FIG. 1 is a front elevational view of a combination viewer and projector incorporating the present invention.
FIG. 5 is a cross-sectional view taken along the line 5—5 of FIG. 4.
FIG. 6 is a cross-sectional view taken along the line 6—6 of FIG. 4.
FIG. 7 is a cross-sectional view taken along the line 7—7 of FIG. 4.

Means is provided within the housing 21 to provide a source of light for use with the magazine 41 and consists of a lamp 116 of the pre-focussed type which is mounted in an elliptical reflector 117. The reflector 117 is formed of plastic and is provided with a highly reflective surface so that energy from the lamp 116 is directed through the window 82 of the magazine and onto the surface 84 in the magazine 41. The front extremity of the reflector 117 is provided with four radially extending tabs 119 which are seated in a semicircular recess 121 provided in a support member or rib 122 formed integral with the housing 21. The support member 122 is provided with reinforcing ribs 123 (see FIGS. 6 and 7). As can be seen from FIG. 6, three of the tabs 119 are seated within the recess 121. By seating three of the tabs in the recess 121, rocking of the reflector 117 is prevented. A semi-cylindrical baffle 126 is formed integral with the lower part of the housing 23 and integral with the support member 122 as shown in FIG. 7 and extends forwardly from the reflector 117 so that its forward extremity is immediately adjacent the window 82 of the magazine 41 (see FIGS. 4 and 7). This light baffle 126 extends to approximately two-thirds of the height of the reflector 117 so that there is a region 127 above the same which opens into the reflector 117 to permit the escape of heat from the lamp 116. Heat is thus permitted to rise upwardly and to pass out of the case through a louvered area 128 provided in the top wall 47 of the housing 21. This louvered area 128 is formed by spaced parallel L-shaped members 129 formed integral with the housing (see FIGS. 6 and 7) and in such a manner so that significant light does not escape from the housing while still permitting hot air to travel upwardly out of the housing.

Figure 4:
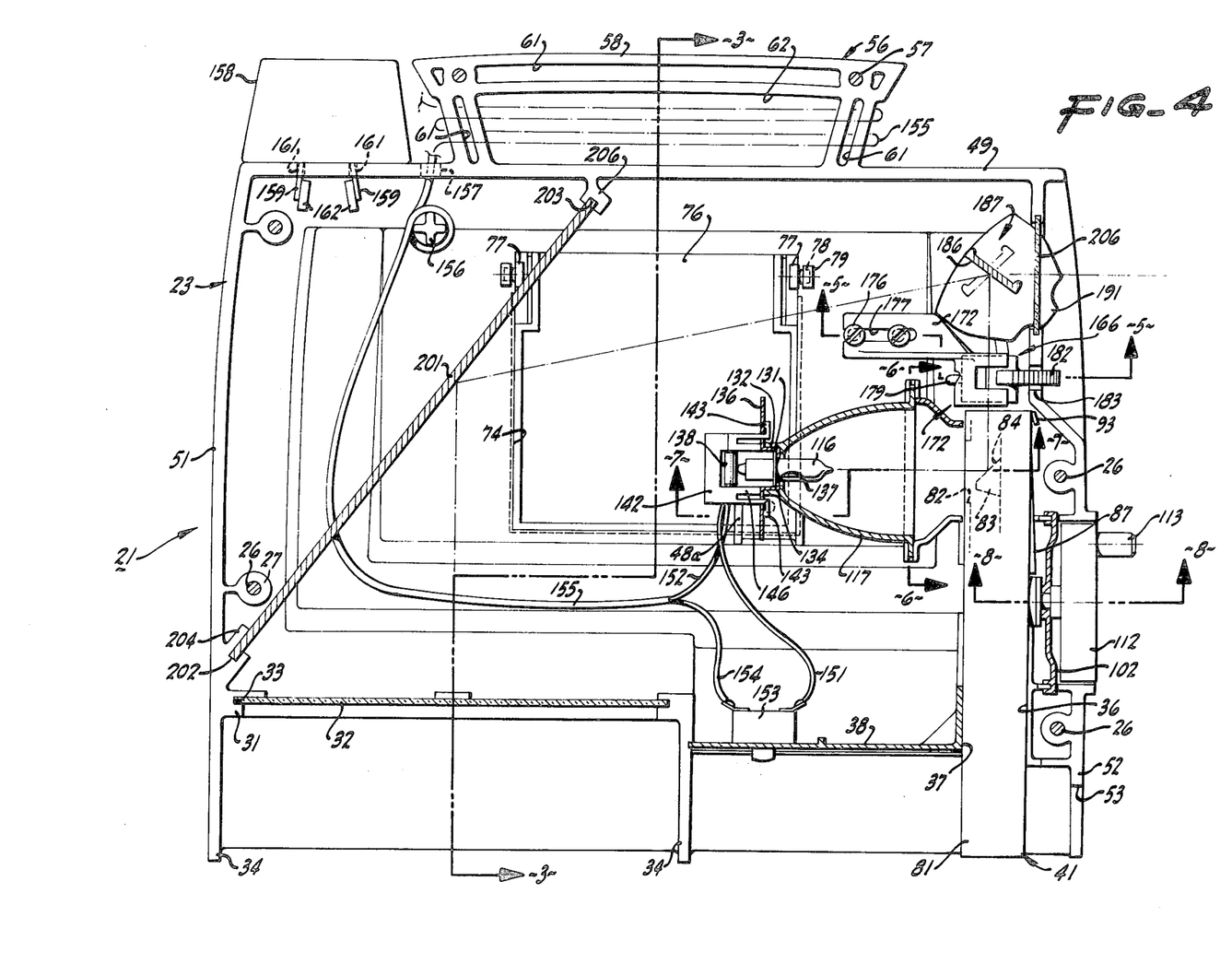
FIG. 4 is a cross-sectional view taken along the line 4—4 of FIG. 3.

Suitable means is provided for removably mounting the lamp 116 within the reflector 117 and for dissipating heat from the lamp 116 so that a plastic reflector 117 can be used. The lamp 116 is provided with a flange 131 which is adapted to seat within a cylindrical recess 132 provided in the reflector 117. The flange 131 also seats in a recess 133 formed by a centrally disposed protrusion 134 in a circular plate or disc 136 formed of a suitable conducting material such as metal. The protrusion 134 seats within the recess 132 of the reflector 117 as shown in FIG. 4. The protrusion 134 is provided with a hole 137 through which the lamp 116 extends. The disc 136 serves to make the ground contact with the flange 131 of the lamp 116.

A contact or clip 138 formed of a suitable conducting material such as brass serves as metal contact for making contact with the central or voltage terminal of the lamp 116. This metal contactor clip 138 is provided with a concave recess 139 (see FIG. 7) which serves to fix the position of the lamp 116 in conjunction with the flange 131 and the recess 132 so that the filaments of the lamp are properly focussed with respect to the elliptical reflector 117. The clip 138 is provided with a pair of ears 141 which are crimped about the sides of a retaining member or piece 142 formed of a suitable insulating material such as plastic (see FIG. 3). The retaining member 142 has a generally U-shaped configuration and is provided with two pairs of spaced generally parallel L-shaped feet 143 formed on opposite sides thereof which extend into spaced parallel slots 144 provided in the disc 136 which extend generally in an upward direction (see FIG. 3). The retaining member 142 is also provided with pairs of spaced generally parallel abutment members 146 which are adjacent to the feet 143 and which engage the other side of the disc 136 so that the retaining member 142 is firmly retained by the disc 136. In mounting the retaining member 142 upon the disc 136, the L-shaped feet 143 are pushed upwardly into the slots 144 of the disc 136 past projections 147 and up into a position in which the clip 138 is snapped over the outermost extremity of the base of the lamp 116 and so that the base seats within the recess 139. The projections 147 serve to prevent the retaining member 142 from dropping out of the slots 144. The retaining member 142 is movable between a position in which the clip 138 engages the base of the lamp 116 and a position below the base of the lamp 116 so that the lamp 116 can be replaced when necessary. As soon as the lamp has been replaced in the disc 136, the retaining member 142 can then be moved upwardly until the clip 138 again engages the lamp. Thus, it can be seen that the lamp 116 can be replaced from the rear of the reflector 117 without the necessity of adjusting the position of the lamp to focus the same.

Means is provided for making electrical contact to the disc 136 and the clip 138 and consists of conductors 151 and 152 with the conductor 151 being connected to the contact or clip 138 and the conductor 152 being connected to the disc 136. The conductor 151 is connected to an on-off slide switch 153 which is mounted in the front wall 38. Another conductor 154 is connected to the switch 153 and joins with the conductor 152 to form a power cord 155 which extends to the left and to the rear within the housing as shown in FIG. 4. The cord 155 is wrapped around a strain relief post 156 and then extends outwardly through a hole 157 provided in the rear wall 49 of the housing. The cord 155, when not in use, is adapted to be wrapped around the handle 56 as shown in FIG. 4. The cord 55 will have a tendency to slip down toward the case because of the inclination of the post-like portions 59 so that the cord will not interfere with the grasping of the handle 56.

A transformer 158 is connected to the end of the cord 155 and is of a suitable type as for example one which reduces the voltage from 110 volts to approximately 5.7 volts which is suitable for use with the lamp 116. A pair of prongs 159 are mounted on the transformer and are of a type which is adapted to be inserted into any conventional 110 volt socket. The housng 21 is provided with a pair of slots 161 through which the prongs 159 can extend so that the transformer 158 can be stowed in this out-of-the-way position adjacent the handle 56 when the combination viewer and projector is not in use. Means is provided in the housing to insure that the transformer 158 will be held in place and consists of a pair of upwardly extending tabs 162 formed integral with the housing 21 which are positioned in such a manner so that they are adapted to be engaged by the prongs 159 and to spread them slightly apart so that they are frictionally engaged by the prongs to retain the transformer 150 on the housing 21.

Optical means is provided for projecting the image which is received through the aperture of the magazine 41. The optical means is in the form of a projection lens optical assembly 166 which is similar to the optical assembly described in copending application Ser. No. 301,763, filed Oct. 30, 1972 now U.S. Pat. No. 3,819,257. As described therein, such an optical assembly consists of a barrellike member 167. This barrel-like member 167 carries two or more elements 168 which serve as a projection lens having approximately a ½ inch focal length. The barrel-like member 167 is seated upon two spaced parallel rails 169 which are formed integral with the bottom part of the housing and extend upwardly at an angle and have upper arcuate surfaces 171 engaged by the barrel 167. Means is provided for securing the barrel 167 in place upon the surfaces 171 and consists of a clamping member 172 which is provided with a semicircular member 173 which is to engage the side and top of the barrel 167 as shown in FIG. 5. The clamping member 172 is secured to a block or post 174 formed integral with the bottom part of the housing 21 by a pair of screws 176 extending through a slot 177 provided in the clamping member 172. The barrel 167 is provided with a small tab or projection 179 which travels in a slot 181 formed in the member 173 which is inclined from the vertical so that when the barrel is rotated, the barrel 167 is shifted toward or away from the magazine 81 to permit focusing of the projection lens with respect to the image which is being received from the magazine. Means is provided to facilitate rotation of the barrel and consists of a wing-like knob 182 which is formed integral with the barrel 167 and extends through an opening 183 formed in the portion of the side wall 52 (see FIG. 5). A slot 183 is formed in the member 173 to accommodate movement of the knob 182. Since the image in the aperture of the magazine 41 is upside down because the magazine 41 is upside down from its normal position in a viewer, the projection lens optical assembly inverts the image by 180° so that it is right side up.

Reflective means is provided for receiving the image from the projection lens assembly 166 and consists of a mirror 186 which is provided with a coating so that it serves as a front or first surface reflector for the image which is received from the projection lens assembly. Means is provided for mounting the mirror 186 and is in the form of a part 187 in which the mirror 187 is formed integral therewith. The part 186 is provided with a planar surface which is coated with a suitable coating to provide the reflecting surface serving as the mirror 186.

Figure 11:
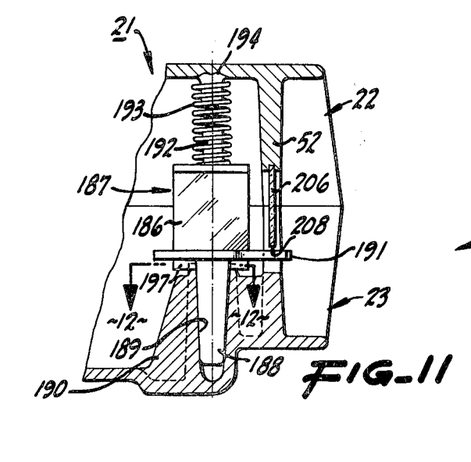
FIG. 11 is an enlarged detailed view of the shiftable mirror.
Figure 12:
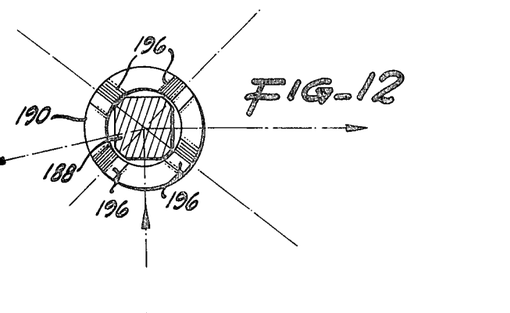
FIG. 12 is a cross-sectional view taken along the line 12—12 of FIG. 11.

The part 187 is also provided with a tapered downwardly extending projection or post 188 which is seated in a tapered hole 189 provided in a post 190 formed in the lower part 23 of the housing 21 so that the part 187 can be rotated therein and is self-centering. The part 187 is provided with a wing-like knob 191 formed integral therewith which extends outwardly through the wall 52 so that it can be grasped by hand to permit rotation of the part for a purpose hereinafter described. The part 187 also carried a boss 192 which has a lower end of a compression spring 193 mounted thereon. The other end of the compression spring 193 is retained by a boss or tab 194 formed integral with the top part 22 of the housing 21. The spring 193 serves as means for urging the part 187 in a downward direction to form a part of detent means which is utilized for retaining the mirror 186 in desired predetermined positions. Such detent means consist of four spaced notches 190 as shown in FIG. 12. These notches are adapted to be engaged by downward extending projection 197 formed on the bottom of the knob 191 (see FIG. 11).

As can be seen from FIG. 4, the mirror 186 is movable between two positions one of which will be called the viewing position which is shown in solid lines in FIG. 4, and the other of which will be called the projecting position as shown in broken lines in FIG. 4. In the first position, the image from the projecting lens is reflected in a direction which is within the confines of the housing 21 towards a large mirror 201 which is also provided with a coating on its first or front surface so that the image is reflected therefrom directly onto the rear side of the viewing screen 32. The mirror 201 is held in place by being mounted in recesses 202 and 203 formed in projections 204 and 206 integral with the housing 21. It will be noted that the mirror 201 is inclined at a substantial angle within the housing and generally at approximately 45° with respect to the surface of the viewing screen 32. The mirror 201 can be formed of a suitable material such as plastic which is coated with a reflective coating. Thus, the mirror 201 and the mirror 186 direct the light beam through an angle of 180° to form the image on the screen 32. In addition, each mirror reverses the image end of end so that after the image is reflected by both mirrors 186 and 201, it has the proper end-to-end relationship on the viewing screen 32.

When the mirror 186 is moved to the broken line position shown in FIG. 4, the image received from the projecting lens is reflected out of the housing 21 through a transparent window 206 provided in an opening 207 in the side wall 52. The window 206 is formed of a suitable material such as plastic. The knob 191 travels in a sot 208 provided below the window 206 to make possible movement between the two extreme positions for the mirror 186. When the image is transmitted through the window 206, it can be projected onto an exterior screen (not shown) or wall much in the same manner as with a conventional projector. A wire U-shaped stand 211 is mounted in holes 212 provided in the foot-like portions 71 and is movable from an out-of-the-way position shown in FIG. 2 by swinging movement to an upright position shown in FIG. 3. In the position shown in FIG. 2, the combination viewer and projector is in position for use as a projector. In the position shown in FIG. 3, it is in position for use as a viewer.

Operation of the combination viewer and projector may now be briefly described as follows. The unit can be placed in operation by removing the transformer 158 and unwrapping the power cord 155 from the handle 56 and then plugging the transformer 158 into a suitable receptacle. The combination viewer and projector then should be placed on a convenient table or other suitable support. Let it be assumed that it is desired to utilize the viewing screen 32. The stand 211 is moved to the position shown in FIG. 2. The knob 191 is shifted to the position shown in solid lines in FIG. 4. Assuming that the lamp 116 has been turned on by the switch 153, light from the lamp 116 will be directed onto the magazine 41 by the elliptical reflector 117 through the window 82 onto the surface 84 through the film disposed within the cartridge 41 and then through the lens assembly 166 onto the mirror 201 which reflects the image onto the screen 32 where it can be viewed by the viewer. The image is bright enough so that it can be viewed in normal ambient light.

The operator by observing the screen 32 can at the same time by turning the crank disc 112 cause progressive movement of the film through the cartridge or magazine 41 and to present images from the film onto the screen 32 as motion pictures. As described in said copending application Ser. No. 78,115 filed on Oct. 5, 1970 abandoned in favor of U.S. Pat. No. 3,817,610, the film can be advanced either in a forward direction or can be advanced in a rearward direction.

If it is desired to utilize the combination as a projector, it is merely necessary to shift stand 211 to the vertical position shown in FIG. 2. The knob 191 is moved to the other position so that the mirror is shifted to the brokenline position shown in FIg. 4 whereby the image from the lens assembly 166 is projected out through the window 206 and then onto a suitable screen or wall which serves as a surface for receiving the image which is being projected. Since the rear end of the combination viewer and projector has been lifted by the stand 211, the image which is projected is properly oriented, that is, its outlines extend in vertical and horizontal directions.

The combination viewer and projector is very compact and gives an excellent image considering the size of the apparatus. In addition, it is constructed in such a manner that it is relatively inexpensive and can be produced utilizing mass production techniques. Excellent qualities of viewing and projection are obtained with a high percentage of the available energy from the lamp 116 being transmitted onto the viewing screen. This is made possible because use of a lamp having a focused element in the ellipsoidal reflector 117 and by utilizing good first surface reflectors for reflecting the image as well as good projection lens assembly. Even though there is a substantial amount of light generated by the lamp, the combination viewer and projector is one which does not require the use of additional or forced cooling such as provided by a blower or fan. The lamp is held within the metal disc which serves as a heat radiator for the lamp. The cantilever spring or clamp serves several functions. First, it serves to retain the lamp within the socket. It also serves as an electrical contact and for an electrical contact. The other contact serves as a heat dissipating member.

The combination viewer and projector is also advantageous in that it is constructed in such a manner that it can be utilized by children without danger. In addition, the combination viewer and projector is constructed in such a manner that the lamp can be readily changed. For example, it is merely necessary to open the door 77, to slide the retaining member 142 downwardly and to remove the lamp. A new lamp is then inserted. The returning member is then moved upwardly so that the spring contact member or clip 138 snaps into place.

Figures 13, 14, 15:
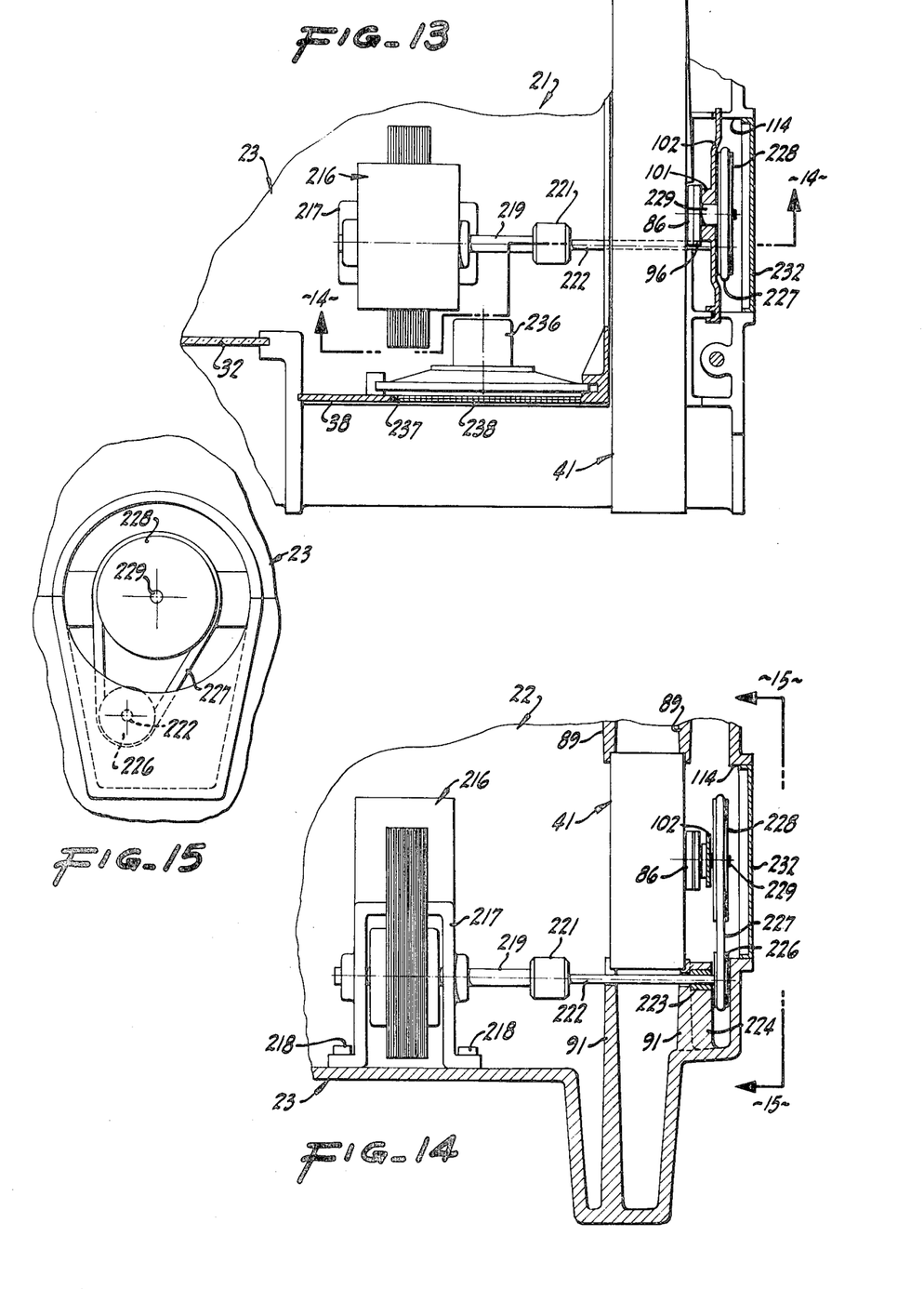
FIG. 13 is a partial cross-sectional view of another combination viewer and projector incorporating the present invention which is motor driven.
FIG. 14 is a cross-sectional view taken along the line 14—14 of FIG. 13.
FIG. 15 is a side elevational view looking along the line 15—15 of FIG. 14 with the cap removed.

Another embodiment of the invention is shown in FIGS. 13, 14 and 15 in which a motor drive has been provided for advancing the film in the magazine 41. The motor drive which is provided consists of a reversible motor 216 of a suitable type such as an AC or DC motor having a suitable output speed. The motor 216 is mounted in a bracket 217 which is secured to the bottom part of the housing 21 by a suitable means such as screws 218. The motor 216 is provided with an output shaft 219 which is connected by coupling 221 to a shaft 222 that is rotatably mounted in the rails 91 supporting the magazine 41. The shaft 222 is mounted in a bearing 223 mounted in a support block 224 which is formed integral with one of the ribs 91 and the bottom part of the housing 23. A pulley 226 is mounted on the shaft 222. The pulley 226 drives a belt 227 which drives a large pulley 228. The pulley 228 is mounted on a shaft 229 which is rotatably mounted in the boss 101 of the spring member 102. The drive member 96 is mounted on the shaft 229 and engages the driven member 86 which forms a part of the magazine 41 as hereinbefore described.

A removable cover 232 is mounted in the recess 114 and covers the pulley 228 and the belt 227 to protect the same from access by children and the like.

A speaker 236 of a conventional type is mounted upon the front wall 38 on the rear side thereof. An opening 237 is provided in the wall 38 and is covered by fabric 238 or other suitable material to permit sound emanating from the speaker 236 to pass therethrough.

The operation of this embodiment of this invention is substantially identical to that hereinbefore described with the exception that the advancement of the film in the magazine 41 is by way of motorized means rather than the manual means provided in the previous embodiment. In addition, there has been provided means whereby a sound track on the film can be supplied to the speaker 236 although the electronics necessary for doing so is not shown in the drawings.

It is apparent from the foregoing that there has been provided a combination viewer and projector which has many advantages. It can be utilized for showing motion picture film which is provided in magazines or cartridges at a very low cost and in a convenient manner. The combination viewer and projector is streamlined and has an attractive appearance. The cartridge or magazine can be readily inserted and removed. When the combination viewer and projector is of the manual type, the hand crank is readily accessible for convenient operation. A handle is provided on the combination viewer and projector so that it can be readily carried from one location to another like a small briefcase. The unit can be readily converted from a rear screen viewer into a wall projector. The unit is also of a type which can be readily utilized by children.

It is also apparent from the foregoing that the combination viewer and projector utilizes a magazine cartridge which is of the type that projects an image which can be viewed directly as in a viewer. Thus, this makes it possible to utilize magazines which are utilized in conjunction with viewers in the combination viewer and projector. Substantially all the parts of the combination viewer and projector have been formed of plastic and even the optical system is formed of plastic molded parts, thus facilitating inexpensive mass production. In addition, the combination viewer and projector is constructed in such a manner that it can be formed so that it can be used solely as a projector or solely as a viewer.

We claim:

1. In a combination viewer and projector, a housing having a front side with a slot and an opening formed therein, a magazine removably mounted in said housing and having an aperture, said magazine when mounted in said housing having a portion thereof extending through said slot in said housing and being accessible from the exterior of the housing to facilitate insertion and removal of the magazine into and from the housing through the front side of the housing, said magazine carrying a length of motion picture film adapted to be advanced in the magazine, said magazine having a single driven member accessible from the exterior of the magazine and driving means for engaging said film for advancing the film in forward and reverse directions in the magazine in a step by step manner to form motion pictures, said single driven member serving as the sole means for driving the driving means for engaging said film for advancing the film, a source of light in the housing, means in said housing and in said magazine for receiving light from said source of light and directing it through said film to provide an optical image in the aperture, a rear-lighted viewing screen carried in said housing and viewable through the opening in the front side, said housing having a shroud formed on the front side thereof which extends outwardly from the face of the screen and which generally surrounds the screen and the portion of the cartridge that is exterior of the housing, said housing being formed with a projection opening, reflecting means in said housing for receiving said image and for directing said image onto said screen or alternatively through said projection opening, a drive member mounted in said housing which removably engages said driven member of said magazine and means carried by the housing engaging said driven member to cause rotation of the drive member and the driven member to thereby cause movement of said film so that motion picture images are formed for viewing.

2. A combination viewer and projector as in claim 1 together with means accessible from the exterior of the housing for shifting said reflecting means between first and second predetermined positions to permit said alternative viewing.

3. A combination viewer and projector as in claim 1 wherein said means carried by the housing includes crank means mounted in the housing and engageable from the exterior of the housing and connected to said drive member for rotating the drive member.

4. A combination viewer and projector as in claim 1 wherein said means carried by the housing includes motorized means mounted in the housing and connected to the drive member for rotating the drive member.

5. A combinational viewer and projector as in claim 1 wherein said source of light includes a lamp, an elliptical reflector receiving said lamp for directing energy received from said lamp towards said magazine, said lamp being small in size in in comparison to the reflector and removable means for retaining said lamp in said reflector and for energizing the lamp.

6. A combination viewer and projector as in claim 5 together with a light baffle mounted between said reflector and said magazine for reducing the amount of light scattered from said lamp.

7. A combination viewer and projector as in claim 6 wrein said baffle is provided with an opening to permit the escape of heat from said lamp.

8. A combination viewer and projector as in claim 5 together with a conducting cord connected to said lamp and a transformer secured to said cord and means carried by said housing for mounting said transformer in an out-of-the-way position on said housing exterior of said housing when said combination viewer and projector is not in use and permitting removal of said transformer from said housing when said combination viewer and projector is to be used.

9. A combination viewer and projector as in claim 1 wherein said housing is provided with a base adapted to rest upon a horozontal surface and whereas said housing is formed in such a manner so that the screen is inclined at an angle from the vertical to facilitate viewing by the viewer.

10. A combination viewer and projector as in claim 9 together with means carried by the housing for positioning the housing with respect to said horizontal surface so that the image projected is properly oriented.

11. In a combination viewer and projector for use with a magazine of the type having an aperture and a length of film therein and means including a rotatable reversible single driven member accessible from the exterior of the magazine and driving means for engaging the film for advancing the film progressively past the aperture in forward and reverse directions in a plane and means for receiving light exterior of the magazine and for directing it onto the portion of the film which is in the aperture of the magazine, said single driven member serving as the sole means for driving the driving means for engaging the film, said combination viewer and projector including a housing having a front side portion lying in a plane, said housing having a recess in the front side adapted to slidably receive the magazine from the front side in a direction of movement substantially perpendicular to the plane of the front side portion in such a manner so that when the magazine is mounted in the recess in the housing a portion of the magazine extends from the housing and is accessible from the exterior of the housing to facilitate insertion and removal of the magazine into and from the housing, means including a drive member rotatably carried by the housing and adapted to be engaged by the driven member to cause rotation of the driven member when the drive member is rotated whereby the film in the magazine may be advanced in a step-by-step manner past the aperture in the magazine to form motion pictures, said drive member serving as the sole means for driving said driven member, a source of light within the housing, means within the housing directing light from the source toward the recess for the magazine whereby light may be projected through the film and the aperture in the magazine to form a projected image in the aperture when a magazine is in the housing, a rear-lighted viewing screen carried by the housing lying in a plane parallel to the plane in which the film is moved, said housing having a shroud formed on the front side thereof which extends outwardly from the screen and generally surrounds the screen, said housing being formed with a projection opening, and means in the housing for receiving the projected image from a magazine in the housing and for directing the same onto the screen or, alternatively, to direct the image through the projection opening 12. A combination viewer and projector as in claim 11 together with lens means mounted in the housing through which the projected image passes and means accessible from the exterior of the housing for focusing said lens means.

13. In a combination viewer and projector, a housing having a planar front side portion with a magazine receiving slot formed therein, a magazine slidably and removably mounted in said slot in said housing through said front side portion in a direction generally perpendicular to the front side portion and having an aperture, said magazine carrying a length of film adapted to be advanced in the magazine, said magazine having a single rotatable driven member accessible from the exterior of the magazine and engaging the length of film, a source of light in the housing, means in said housing and in said magazine for receiving light from said source of light and directing it through said film to provide an optical image in the aperture, said magazine being of a type which in its normal upright position provides an image which upon direct viewing is right side up, said magazine being mounted upside down in said housing so that said image is upside down, said housing and said magazine including means preventing said magazine from being inserted into said housing other than with said image upside down, a projection lens assembly in said housing, receiving said image from the magazine and inverting the image through 180°, a rear-lighted viewing screen carried in said housing, reflecting means in said housing for directing said image from said projection lens assembly onto the rear side of said viewing screen, a drive member rotatably mounted in the housing and engaged by said driven member and means carried by the housing engaging the drive member to cause rotation of the drive member.

14. In a combination viewer and projector a housing having a magazine receiving slot, a magazine slidably and removably mounted in said slot in said housing and having an aperture, said magazine carrying a length of film adapted to be advanced in the magazine, said magazine having a single rotatable driven member accessible from the exterior of the magazine and engaging the length of film, a source of light in the housing, means in said housing and in said magazine for receiving light from said source of light and directing it through said film to provide an optical image in the aperture, said magazine being of a type which in its normal upright position provides an image which is right side up and has an orientation to permit direct viewing, said magazine being mounted upside down in said housing so that the image is upside down, a projection lens assembly in said housing receiving said image from the magazine and inverting the image through 180°, a rear-lighted viewing screen carried in said housing, reflecting means in said housing for directing said image from said projection lens assembly onto the rear side of said viewing screen, a drive member rotatably mounted in said housing and engaged by said driven member, means carried by the housing engaging the drive member to cause rotation of the drive member, said source of light including a lamp, an elliptical reflector receiving said lamp for directing energy from said lamp toward said magazine, said lamp being of the pre-focused type and means for retaining said lamp in said elliptical reflector to permit insertion and removal of said lamp, said retaining means including a clip having a recess therein adapted to receive said lamp so as to retain said lamp in a predetermined position whereby it is in focus with respect to the elliptical reflector and means for retaining said clip and permitting sliding motion of the clip into and out of engagement with the lamp.

15. In a combination viewer and projector, a housing, a magazine slidably and removably mounted in said housing and having an aperture, said magazine carrying a length of film adapted to be advanced in the magazine, a source of light in said housing, means in said housing and in said magazine for receiving light from said source of light and directing it through said film to provide an optical image in aperture, a projection lens assembly in said housing receiving said image from said magazine, a rear-lighted viewing screen carried in said housing, reflecting means in said housing for directing said image from said projection lens assembly onto the rear side of said viewing screen, said source of light including a lamp, an elliptical reflector receiving and encircling said lamp for directing energy forwardly from said lamp towards said magazine, and disc-like heat sink means engaging the base of the lamp rearwardly of the elliptical reflector and extending radially therefrom and serving to dissipate heat generated in the lamp base whereby the need for forced air cooling is eliminated in the combination viewer and projector.

16. In a combination viewer and projector, a housing, a magazine removably mounted in said housing and having an aperture, said magazine carrying a length of film adapted to be advanced in the magazine, a source of light in the housing, means in said housing and in said magazine for receiving light from said source of light and directing it through said film to provide an optical image in the aperture, a projection lens assembly in said housing receiving said image from the magazine, a rear-lighted viewing screen carried in said housing, a window carried by said housing, reflecting means in said housing for directing said image from said projection lens assembly onto the rear side of said viewing screen or alternatively through said window, said reflecting means including a member rotatably mounted in said housing for movement between first and second positions, said member having a mirror carried thereby, detent means for retaining said member in either of said first or second positions and means exterior of the housing connected to said member which is adapted to be grasped by hand to permit movement of said member between first and second positions.

17. In a combination viewer and projector for use with a magazine of the type having an aperture and a length of film therein and means including a rotatable single driven member accessible from the exterior of the magazine and driving means for engaging the film for advancing the film progressively past the aperture in forward and reverse directions in a plane and means for receiving light exterior of the magazine and for directing it onto the portion of the film which is in the aperture of the magazine, said single drive member serving as the sole means for driving the driving means for engaging the film, said combination viewer and projector including a housing having a front side, said housing having a recess in the front side and adapted to slidably receive the magazine from the front side in such a manner so that when the magazine is mounted in the recess in the housing a portion of the magazine extends from the housing and is accessible from the exterior of the housing to facilitate insertion and removal of the magazine into and from the housing, a removable bar-like spring member, means carried by the housing for receiving and retaining said bar-like spring member, means including a drive member rotatably mounted in said bar-like spring member and adapted to be engaged by the driven member to cause rotation of the driven member when the drive member is rotated whereby the film in the magazine may be advanced in a step-by-step manner past the aperture in the magazine to form motion pictures, said drive member serving as the sole means for driving said driven member, a source of light within the housing, means within the housing directing light from the source toward the recess for the magazine whereby light may be projected through the film and the aperture in the magazine to form a projected image in the aperture when a magazine is in the housing, a rear-lighted viewing screen carried by the housing lying in a plane parallel to the plane in which the film is moved, said housing being formed with a projection opening, and means in the housing for receiving the projected image from a magazine in the housing and for directing the same onto the screen or, alternatively, to direct the image through the projection opening.

18. A combination viewer and projector as in claim 17 wherein said means including a drive member includes a manually operated crank member accessible from the exterior of the housing for rotating the drive member.

* * * * *